United States Patent
Yasuzaka et al.

(10) Patent No.: US 9,464,600 B2
(45) Date of Patent: Oct. 11, 2016

(54) ROTATIONAL PUMP AND FUEL VAPOR LEAKAGE DETECTION DEVICE HAVING THE SAME

(71) Applicant: DENSO CORPORATION, Kariya, Aichi-pref. (JP)

(72) Inventors: Taiki Yasuzaka, Nagoya (JP); Yasuo Kato, Niwa-gun (JP)

(73) Assignee: DENSO CORPORATION, Kariya (JP)

( * ) Notice: Subject to any disclaimer, the term of this patent is extended or adjusted under 35 U.S.C. 154(b) by 112 days.

(21) Appl. No.: 14/568,607

(22) Filed: Dec. 12, 2014

(65) Prior Publication Data

US 2015/0167598 A1    Jun. 18, 2015

(30) Foreign Application Priority Data

Dec. 18, 2013   (JP) ................................ 2013-261268

(51) Int. Cl.
| | | |
|---|---|---|
| *F02M 25/08* | (2006.01) | |
| *F04C 29/00* | (2006.01) | |
| *F04C 23/00* | (2006.01) | |
| *G01M 3/22* | (2006.01) | |
| *F04C 28/06* | (2006.01) | |
| *F04C 25/02* | (2006.01) | |
| *F04C 28/02* | (2006.01) | |
| *F04C 18/34* | (2006.01) | |

(52) U.S. Cl.
CPC ........ *F02M 25/0818* (2013.01); *F04C 23/003* (2013.01); *F04C 28/065* (2013.01); *F04C 29/0071* (2013.01); *G01M 3/226* (2013.01); *F02M 25/089* (2013.01); *F04C 18/34* (2013.01); *F04C 25/02* (2013.01); *F04C 28/02* (2013.01); *F04C 2270/03* (2013.01)

(58) Field of Classification Search
CPC  F04C 28/065; F04C 29/0071; F04C 23/003; F04C 25/02; F04C 28/02; F04C 18/34; F04C 2270/03; G01M 3/226; F02M 25/0818; F02M 25/089

USPC .............................................. 73/40.7, 114.39
See application file for complete search history.

(56) References Cited

U.S. PATENT DOCUMENTS

| | | | | |
|---|---|---|---|---|
| 2,824,522 | A * | 2/1958 | Compton ............ | F04C 15/0026 418/132 |
| 4,715,800 | A * | 12/1987 | Nishizawa .......... | F16D 25/0635 192/83 |
| 6,019,584 | A * | 2/2000 | Uppal ..................... | F04C 2/103 418/61.3 |
| 2003/0223900 | A1 | 12/2003 | Cho et al. | |
| 2006/0213218 | A1* | 9/2006 | Uno ..................... | F01C 11/004 62/467 |
| 2007/0023015 | A1 | 2/2007 | Uchida et al. | |
| 2009/0148329 | A1* | 6/2009 | Kobayashi ......... | F02M 25/0809 418/104 |

FOREIGN PATENT DOCUMENTS

JP          S60-39790 U  *   3/1985    ............... F04C 23/00

OTHER PUBLICATIONS

Office Action issued Dec. 1, 2015 in corresponding JP Application No. 2013-261268.

* cited by examiner

*Primary Examiner* — Hezron E Williams
*Assistant Examiner* — Marrit Eyassu

(57) ABSTRACT

A pump casing has two external communication holes communicating with an outside. A partition member partitioning an interior of the pump casing into a first space and a second space. The first space communicates with the two external communication holes. The partition member have two internal communication holes communicating the first space with the second space. A first rotor member is rotatably accommodated in the first space. A second rotor member is rotatably accommodated in the second space. A torque switching unit is configured to switch between transmission of a running torque selectively to the first rotor member and transmission of the running torque to both the first rotor member and the second rotor member.

2 Claims, 5 Drawing Sheets

PRESSURE DETECTION PASSAGE ⟷ ATMOSPHERIC PASSAGE

FIG. 3

PRESSURE DETECTION PASSAGE ⟵⟶ ATMOSPHERIC PASSAGE

FIG. 4

PRESSURE DETECTION PASSAGE ⟵⟶ ATMOSPHERIC PASSAGE

FIG. 5

PRESSURE DETECTION PASSAGE ⟵⟶ ATMOSPHERIC PASSAGE

ROTATIONAL PUMP AND FUEL VAPOR LEAKAGE DETECTION DEVICE HAVING THE SAME

CROSS REFERENCE TO RELATED APPLICATION

This application is based on reference Japanese Patent Application No. 2013-261268 filed on Dec. 18, 2013, the disclosure of which is incorporated herein by reference.

TECHNICAL FIELD

The present disclosure relates to a rotational pump. The present disclosure further relates to a fuel vapor leakage detection device having the rotational pump.

BACKGROUND

Conventionally, a known fuel vapor leakage detection device is configured to detect leakage of fuel vapor from a fuel tank and/or from a canister, which adsorbs fuel vapor caused in the fuel tank. The fuel vapor leakage detection device includes a pump, a connection pipe, a pressure sensor, an air filter, and/or the like. The pump pressurizes or depressurizes an interior of a fuel tank and/or a canister. The connection pipe connects the fuel tank, the canister, and the pump with each other. The pressure sensor detects pressure in the fuel tank and/or the canister. The air filter captures foreign matter contained in air drawn with the pump from the atmosphere. For example, Patent Document 1 discloses a fuel vapor leakage detection device including a pump, which is connected with a canister through two connection pipes.

(Patent Document 1)
Publication of unexamined Japanese patent application No. 2007-32523

The fuel vapor leakage detection device disclosed in Patent Document 1 depressurizes an interior of a fuel tank and/or the canister by using one of the two connection pipes and detects leakage of fuel vapor from the fuel tank and/or the canister. Therefore, the one connection pipe is formed to enable to flow vapor in a relatively small quantity under high differential pressure. In addition, the other of the two connection pipes is used to pressurize the interior of the canister and to supply fuel vapor in the canister to an intake pipe, which is connected to an internal combustion engine. Therefore, the other connection pipe is formed to enable to flow vapor in a relatively large quantity under low differential pressure. In a case where a singular pump is employed to move vapor to two connection pipes, which cause different pressure losses, the performance of the pump may be determined according to the specification of the connection pipe, which causes greater pressure loss. Therefore, in a case where the pump is used to the connection pipe, which causes smaller pressure loss, the pump may not move vapor efficiently even though the pump consumes a large power.

SUMMARY

It is an object of the present disclosure to produce a pump configured to move vapor efficiently.

According to an aspect of the present disclosure, a rotational pump comprises a pump casing having two external communication holes communicating with an outside. The rotational pump further comprises a partition member partitioning an interior of the pump casing into a first space and a second space, the first space communicating with the two external communication holes, the partition member having two internal communication holes communicating the first space with the second space. The rotational pump further comprises a first rotor member rotatably accommodated in the first space. The rotational pump further comprises a second rotor member rotatably accommodated in the second space. The rotational pump further comprises a torque switching unit configured to switch between transmission of a running torque selectively to the first rotor member and transmission of the running torque to both the first rotor member and the second rotor member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described with reference to drawings.

First Embodiment

Figure 1:
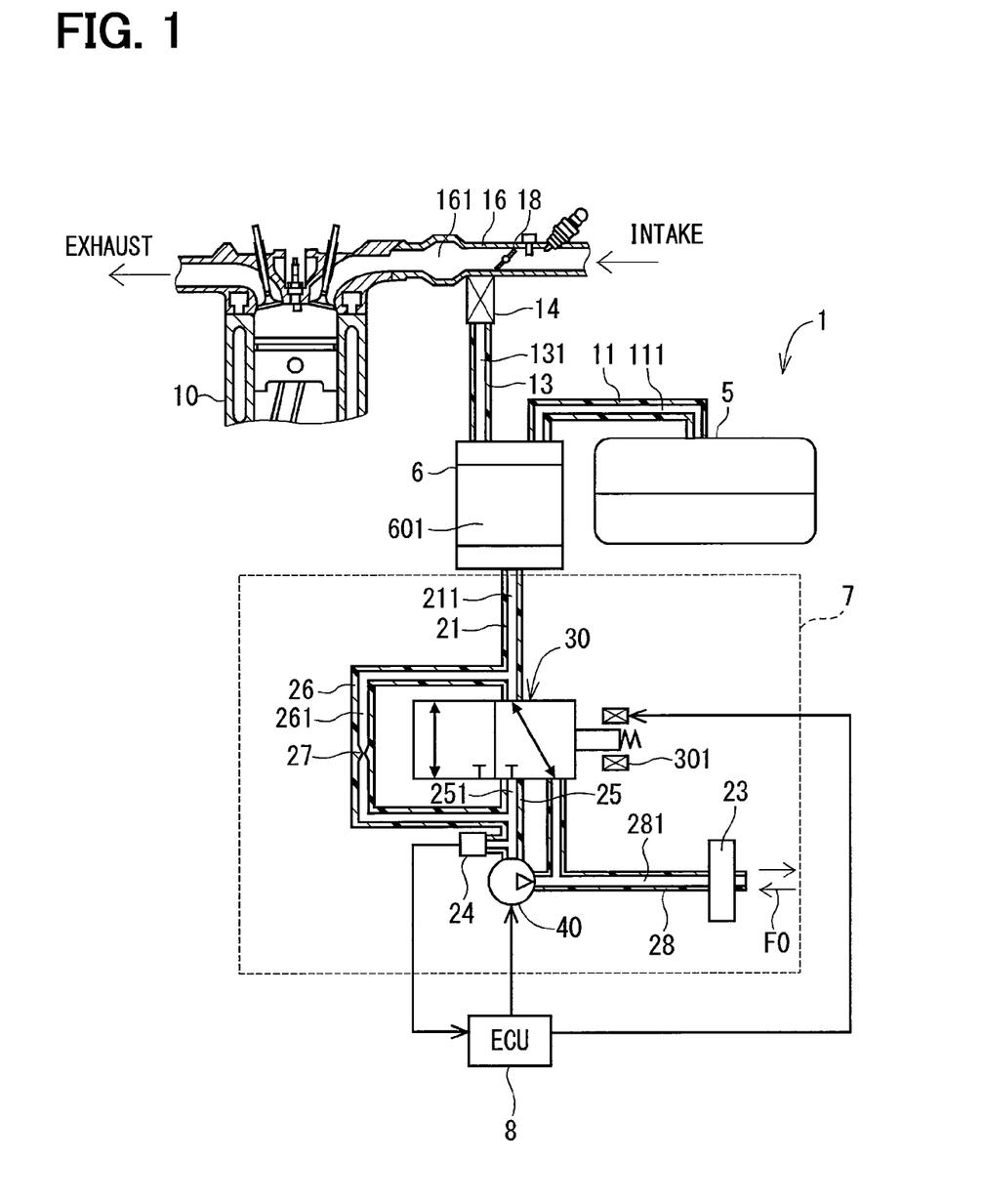
FIG. 1 is a diagram showing a vapor fuel processing apparatus including a rotational pump according to a first embodiment of the present disclosure.
Figure 2:
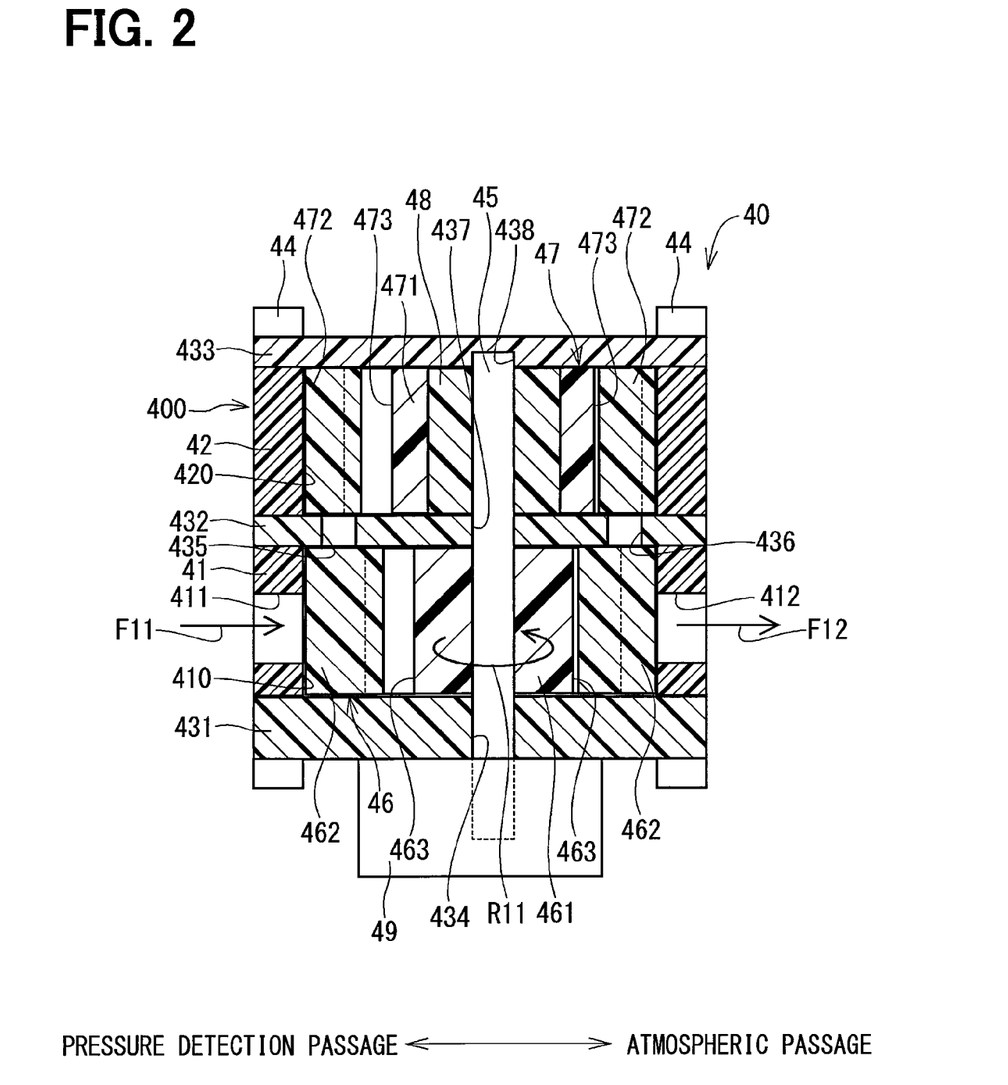
FIG. 2 is a sectional view showing the rotational pump according to the first embodiment of the present disclosure.
Figure 3:
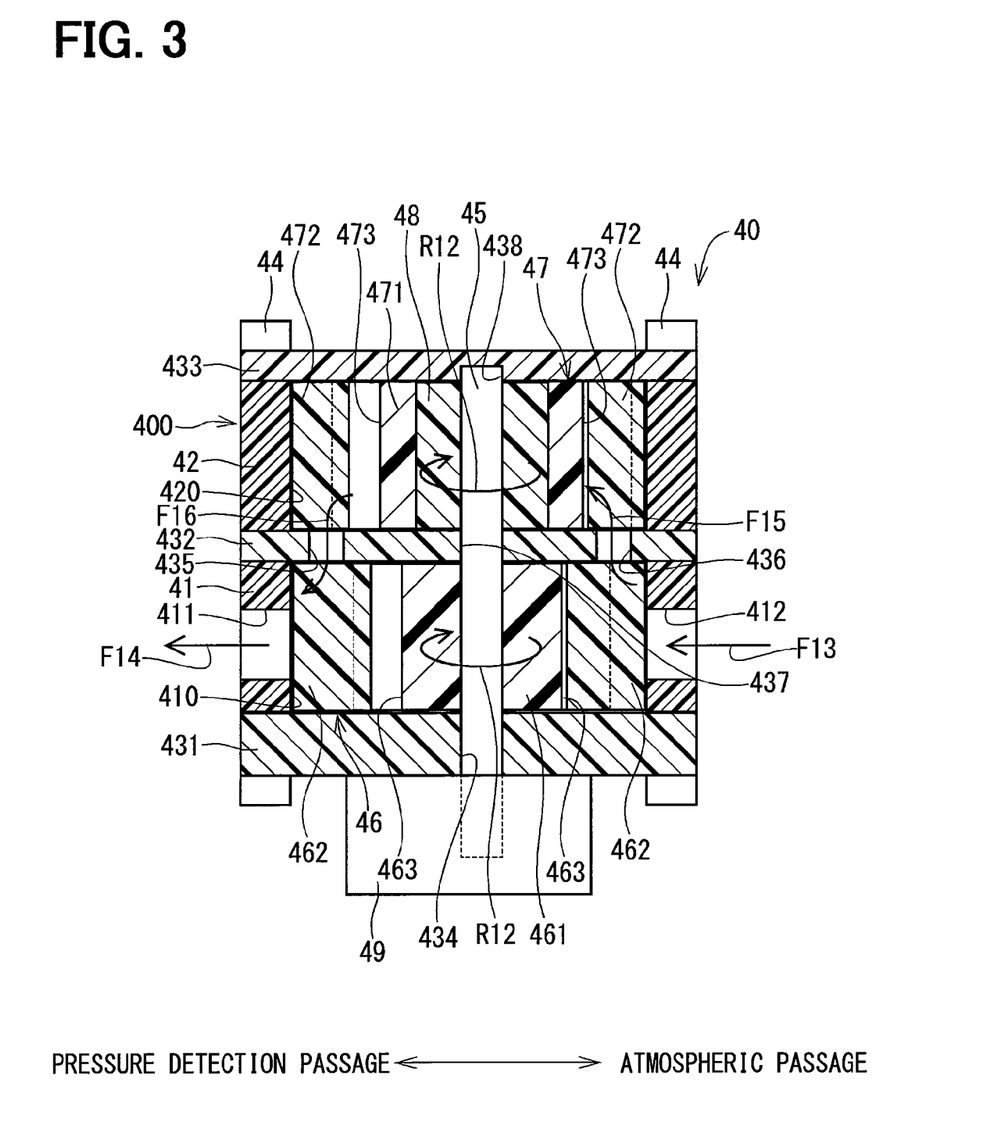
FIG. 3 is a sectional view showing an operation of the rotational pump according to the first embodiment of the present disclosure.

FIGS. 1 to 3 show a vapor fuel processing apparatus equipped with a fuel vapor leakage detection device 7, which employs a rotational pump according to the first embodiment of the present disclosure. The vapor fuel processing apparatus 1 shown in FIG. 1 includes a fuel tank 5, a canister 6, the fuel vapor leakage detection device 7, an ECU 8, and/or the like. In the vapor fuel processing apparatus 1, the canister 6 recovers vapor fuel caused in the fuel tank 5. The canister 6 purges recovered vapor fuel into an intake passage 161. The intake passage 161 is formed with an intake pipe 16, which is connected with an engine 10.

The fuel tank 5 stores fuel, which is to be supplied into the engine 10. The fuel tank 5 is connected with the canister 6 through a first purge pipe 11. The first purge pipe 11 forms a first purge passage 111, which communicates an interior of the fuel tank 5 with the canister 6.

The canister 6 includes a canister adsorption material 601, which recovers vapor fuel caused in the fuel tank 5. Vapor fuel occurs in the fuel tank 5 and passes through the first purge passage 111. The vapor fuel is absorbed into the canister adsorption material 601 and thereby recovered. The canister 6 is connected with the intake pipe 16 through a second purge pipe 13. The second purge pipe 13 forms a second purge passage 131. The second purge pipe 13 is equipped with a purge valve 14. The purge valve 14 is, for example, a solenoid valve. An opening of the purge valve 14 is manipulated to control a quantity of vapor fuel, which is supplied from the canister 6 to the intake passage 161 on the downstream of a throttle valve 18.

The fuel vapor leakage detection device 7 is connected with the canister 6 through a canister connecting pipe 21. The canister connecting pipe 21 forms a canister connection passage 211. The canister connecting pipe 21 may be equivalent to a canister passage formation member. The fuel vapor leakage detection device 7 is configured to detect leakage of fuel vapor from the fuel tank 5, the canister 6, the first purge pipe 11, and the second purge pipe 13. The fuel vapor leakage detection device 7 is further configured to pressurize an interior of the canister 6 when supplying vapor fuel, which is recovered within the canister 6, to the intake pipe 16. Details of an operation of the fuel vapor leakage detection device 7 will be described later.

The fuel vapor leakage detection device 7 includes a rotational pump 40, a switching valve 30, a pressure sensor 24, an air filter 23, multiple pipes, and/or the like. The pressure sensor 24 may be equivalent to a pressure detection unit. The pipes connect the components of the fuel vapor leakage detection device 7.

The rotational pump 40 is connected with the switching valve 30 through a pressure detection pipe 25. The pressure detection pipe 25 is equipped with the pressure sensor 24. The pressure detection pipe 25 may be equivalent to a detection passage formation member. The rotational pump 40 is configured to depressurize an interior of the fuel tank 5 through the pressure detection pipe 25, the switching valve 30, the canister connecting pipe 21, the canister 6, and the first purge pipe 11. In the present state, the pressure sensor 24, which is equipped in the pressure detection pipe 25, detects pressure in a pressure detection passage 251, which is formed in the pressure detection pipe 25. In this way, the pressure sensor 24 detects pressure in the fuel tank 5. The pressure sensor 24 may be equivalent to a pressure detection unit. The rotational pump 40 is communicated with the atmosphere through an atmospheric passage 281 and the air filter 23. The rotational pump 40 pressurizes the interior of the canister 6 through the pressure detection pipe 25, the switching valve 30, and the canister connecting pipe 21. In the present state, vapor fuel, which is adsorbed in the canister adsorption material 601, is desorbed from the canister adsorption material 601 and is supplied into the intake passage 161. Details about configuration of the rotational pump 40 will be described later.

The switching valve 30 communicates the canister connection passage 211 with the atmospheric passage 281 or communicates the canister connection passage 211 with the pressure detection passage 251, according to electricity supply from the ECU 8. Specifically, as shown in FIG. 1, the switching valve 30 communicates the canister connection passage 211 with the atmospheric passage 281, when an electric current is not supplied to the switching valve 30. Alternatively, the switching valve 30 communicates the canister connection passage 211 with the pressure detection passage 251, when an electric current is supplied to the switching valve 30.

A bypass passage pipe 26 forms a switching valve bypass passage 261. The switching valve bypass passage 261 communicates the canister connection passage 211 with the pressure detection passage 251, regardless of electricity supply to the switching valve 30. The bypass passage pipe 26 may be equivalent to a bypass passage formation member. The switching valve bypass passage 261 is equipped with a reference orifice 27. The reference orifice 27 may be equivalent to a throttle portion. The inner diameter of the reference orifice 27 corresponds to a size of a hole, which defines an upper limit of an allowable quantity of leakage of vapor, which contains fuel vapor, from the fuel tank 5.

The air filter 23 is equipped to an atmospheric passage pipe 28. The atmospheric passage pipe 28 may be equivalent to an atmospheric passage formation member. Vapor in the fuel tank 5 or vapor in the canister 6 is discharged through the air filter 23 to the external atmosphere when vapor fuel is adsorbed in the canister adsorption material 601 of the canister 6, when the interior of the fuel tank 5 is depressurized with the rotational pump 40, or when fuel is supplied into the fuel tank 5. To the contrary, when vapor fuel, which is absorbed in the canister 6, is supplied to the intake pipe 16, external air is drawn through the air filter 23 into the rotational pump 40 or the switching valve 30. In the present state, the air filter 23 captures foreign matter contained in the drawn air. In FIG. 1, the arrow F0 represents a flow of vapor and air between the fuel vapor leakage detection device 7 and the atmosphere.

The ECU 8 includes a microcomputer and/or the like. Specifically, the ECU 8 includes a CPU, a RAM, a ROM, and/or the like. The CPU may be equivalent to a computation unit. The RAM and/or the ROM may be equivalent to a storage unit. The ECU 8 is electrically connected with components of the fuel vapor leakage detection device 7. Specifically, the ECU 8 is electrically connected with the pressure sensor 24, which may be equivalent to the pressure detection unit, the rotational pump 40, and a coil 301 of the switching valve 30. The ECU 8 receives a signal according to the pressure in the pressure detection passage 251, which is detected with the pressure sensor 24. The ECU 8 sends a signal to control a driving power of the rotational pump 40. The ECU 8 controls electricity supplied to the switching valve 30.

The configuration of the rotational pump 40 according to the first embodiment may have a feature. Herein, the configuration of the rotational pump 40 will be described in detail with reference to FIGS. 2 and 3. FIGS. 2 and 3 show a direction of a passage, which is communicated with the interior of the rotational pump 40, when the rotational pump 40 is equipped to the fuel vapor leakage detection device 7. Specifically, in the present example, the left side in the drawing communicates with the pressure detection passage 251 and may correspond to a pressure detection passage direction. In addition, in the present example, the right side in the drawing communicates with the atmospheric passage 281 and may correspond to an atmospheric passage direction.

The rotational pump 40 is, for example, a volumetric pump accommodating a rotor, which rotates to supply fluid in a specific direction. According to the first embodiment, the rotational pump 40 is, for example, a vane pump. The rotational pump 40 includes a first tubular portion 41, a second tubular portion 42, a first plate member 431, an intermediate member 432, a second plate member 433, a shaft 45, a first rotor member 46, a second rotor member 47, a one-way clutch 48, an actuator 49, and/or the like. The intermediate member 432 may be equivalent to a partition member. The one-way clutch 48 may be equivalent to a reverse input regulation clutch. The shaft 45, the one-way clutch 48, and the actuator 49 may be equivalent to a torque switching unit.

The first tubular portion 41 is a resin member substantially in a tubular shape. The first tubular portion 41 has an outer wall defining two external communication holes 411 and 412. Each of the external communication holes 411 and 412 communicates the interior of the first tubular portion 41 with the exterior of the first tubular portion 41. The external communication hole 411 communicates with the pressure detection passage 251. The external communication hole 412 communicates with the atmospheric passage 281.

The second tubular portion 42 is a resin member substantially in a tubular shape. The inner diameter of the second tubular portion 42 is substantially the same as the inner diameter of the first tubular portion 41.

The first plate member 431 is substantially in a plate shape. The first plate member 431 is connected with an end of the first tubular portion 41, which is on the opposite side of the second tubular portion 42. An insertion hole 434 is formed in the first plate member 431 at a position shifted from the center of the first plate member 431. The shaft 45 is inserted in the insertion hole 434.

The second plate member 433 is substantially in a plate shape. The second plate member 433 is connected with an end of the second tubular portion 42, which is on the opposite side of the first tubular portion 41. The second plate member 433 forms a bearing 438 at a position shifted from the center of the second plate member 433. The bearing 438 rotatably supports an end of the shaft 45.

The intermediate member 432 is substantially in a plate shape. The intermediate member 432 is equipped between the first tubular portion 41 and the second tubular portion 42. The intermediate member 432 partitions off an interior of a pump casing 400 into a first space 410 and a second space 420. The pump casing 400 includes the first tubular portion 41, the second tubular portion 42, the first plate member 431, and the second plate member 433. The first space 410 is formed with the first tubular portion 41, the first plate member 431, and the intermediate member 432. The second space 420 is formed with the second tubular portion 42, the second plate member 433, and the intermediate member 432.

The intermediate member 432 has two internal communication holes 435 and 436 at positions across the center of the intermediate member 432. The internal communication holes 435 and 436 communicate the first space 410 with the second space 420 independently. An insertion hole 437 is formed in the intermediate member 432 at a position shifted from the center of the intermediate member 432. The shaft 45 is inserted in the insertion hole 437.

As shown in FIG. 2, multiple fastening members 44 fasten the first plate member 431, the first tubular portion 41, the intermediate member 432, the second tubular portion 42, and the second plate member 433 at radially outside positions.

The shaft 45 is substantially in a bar shape. The shaft 45 is inserted through the insertion hole 434 of the first plate member 431 and is further inserted through the insertion hole 437 of the intermediate member 432. One end of the shaft 45 is connected to the actuator 49, which is located on the outside of the first plate member 431. The other end of the shaft 45 is rotatably supported with the bearing 438 of the second plate member 433.

The first rotor member 46 is accommodated in the first space 410. The first rotor member 46 includes a rotor 461, multiple vanes 462, and/or the like. The shaft 45 is affixed to the rotor 461. The shaft 45 is rotatable in accordance with rotation of the shaft 45. The vanes 462 are accommodated in multiple grooves 463 of the rotor 461 and is movable in a radial direction. As the rotor 461 rotates, the vanes 462 rotate in the same direction as the shaft 45, while sliding on the inner wall of the first tubular portion 41 by application of a centrifugal force.

The second rotor member 47 is accommodated in the second space 420. The second rotor member 47 includes a rotor 471, multiple vanes 472, and/or the like.

The rotor 471 is connected with the shaft 45 through the one-way clutch 48, which will be described later. The rotor 471 receives running torque of the shaft 45 transmitted via the one-way clutch 48 and rotates in a clockwise direction when viewed from the upper side in the drawing, when the shaft 45 rotates in the clockwise direction. The clockwise direction may be equivalent to one direction. To the contrary, the one-way clutch 48 cuts off (regulates) transmission of running torque of the shaft 45 thereby not to rotate the rotor 471 when the shaft 45 rotates in a counterclockwise direction when viewed from the upper side in the drawing. The counterclockwise direction may be equivalent to the other (an other) direction.

The vanes 472 are accommodated in multiple grooves 473 of the rotor 471 and is movable in the radial direction. As the rotor 471 rotates, the vanes 472 rotate in the same direction as the shaft 45, while sliding on the inner wall of the second tubular portion 42 by application of a centrifugal force.

The actuator 49 produces a driving force to rotate the shaft 45 in the clockwise direction or in the counterclockwise direction according to an input from the ECU 8.

Subsequently, an operation of the fuel vapor leakage detection device 7 according to the first embodiment will be described. One operation of the fuel vapor leakage detection device 7 is to cause the rotational pump 40 to depressurize the interior of the fuel tank 5, the canister 6, and/or the like and to detect leakage of fuel vapor from a component, such as the fuel tank 5 and/or the canister 6. Details of the operation will be described as follows.

When a predetermined time period elapses subsequent to termination of the engine 10 of the vehicle, the ECU 8 is activated by a soak timer (not shown). To begin with, detection of the atmospheric pressure is implemented in order to correct an error caused according to the altitude of a place where the vehicle is parked. When electricity is not supplied to the coil 301, the atmospheric passage 281 is communicated with the canister connection passage 211 through the switching valve 30. In addition, the canister connection passage 211 is communicated with the pressure detection passage 251 through the switching valve bypass passage 261. That is, the pressure detection passage 251 is communicated with the atmosphere. In this way, the pressure sensor 24, which is equipped to the pressure detection pipe 25, is enabled to detect the atmospheric pressure. When detection of the atmospheric pressure is completed, the ECU 8 calculates the altitude of the place, where the vehicle is parked, from the detected pressure.

Subsequently, electricity is supplied to the rotational pump 40. In the present state, as shown in FIG. 2, the actuator 49 rotates the shaft 45 in the counterclockwise direction represented by the arrow R11. When the shaft 45 rotates in the counterclockwise direction, the first rotor member 46, which is accommodated in the first space 410, also rotates in the counterclockwise direction. To the contrary, the one-way clutch 48 does not transmit running torque of the shaft 45 to the second rotor member 47. Therefore, the second rotor member 47, which is accommodated in the second space 420, does not rotate. In this way, air is sent from the first space 410 in the atmospheric passage direction. Therefore, as represented by the arrows F11 and F12 in FIG. 2, vapor flows from the pressure detection passage 251 toward the atmospheric passage 281 thereby to depressurize the pressure detection passage 251. When the pressure detection passage 251 is depressurized, air flows into the pressure detection passage 251 after passing through the atmospheric passage 281, the switching valve 30, the canister connection passage 211, and the switching valve bypass passage 261. Air flowing into the pressure detection passage 251 is throttled with the reference orifice 27. Therefore, pressure in the pressure detection passage 251 becomes low. Pressure in the pressure detection passage 251 decreases to a predetermined pressure corresponding to the opening area of the reference orifice 27, and subsequently, the pressure becomes substantially constant. Pressure in the pressure detection passage 251 as detected is stored as a reference pressure.

Subsequent to the detection of the reference pressure, electricity is supplied to the coil 301 of the switching valve 30. In this way, the switching valve 30 is manipulated to block the canister connection passage 211 from the atmospheric passage 281 and to communicate the canister connection passage 211 with the pressure detection passage 251. When the canister connection passage 211 is communicated with the pressure detection passage 251, the fuel tank 5 is also communicated with the pressure detection passage 251. Thus, pressure in the pressure detection passage 251 becomes the same as pressure in the fuel tank 5.

When the canister connection passage 211 is communicated with the pressure detection passage 251, the rotational pump 40, which rotates the shaft 45 in the direction shown by the arrow R11, depressurizes the interior of the fuel tank 5.

In a case where continuation of rotation of the rotational pump 40 decreases pressure in the pressure detection passage 251, i.e., pressure in the interior of the fuel tank 5 below the reference pressure previously detected, it is determined that a quantity of leakage of vapor, which includes fuel vapor from the fuel tank 5, is below the allowable quantity. Specifically, when the pressure inside the fuel tank 5 decreases below the reference pressure, air does not intrude from the outside of the fuel tank 5 into the fuel tank 5, or a quantity of air intruding into the fuel tank 5 is below a quantity of air, which can pass through the reference orifice 27. Therefore, it is determined that an airtight property of the fuel tank 5 is sufficiently secured.

To the contrary, when the pressure inside the fuel tank 5 does not decrease to the reference pressure, it is determined that a quantity of leakage of vapor, which includes fuel vapor from the fuel tank 5, is beyond the allowable quantity. That is, when the pressure inside the fuel tank 5 does not decrease to the reference pressure, it is conceivable that air intrudes from the outside of the fuel tank 5 into the fuel tank 5, as the interior of the fuel tank 5 is depressurized. Therefore, it is determined that an airtight property of the fuel tank 5 is not sufficiently secured.

When determination of the airtight property of the fuel tank 5 is completed, electricity supply to the switching valve 30 is terminated. Subsequently, the reference pressure is confirmed (detected) again, and electricity supply to the rotational pump 40 is terminated. The ECU 8 detects that the pressure in the pressure detection passage 251 recovers to the atmospheric pressure. Subsequently, the ECU 8 terminates operation of the pressure sensor 24. Thus, the ECU 8 terminates the fuel vapor leakage detection processing.

Another operation of the fuel vapor leakage detection device 7 is to supply fuel vapor, which is absorbed in the canister adsorption material 601 of the canister 6, to the intake pipe 16. Details of the operation will be described as follows.

When the vehicle is travels, electricity is supplied to the coil 301 of the switching valve 30 and the rotational pump 40. In this way, the switching valve 30 is manipulated to block the canister connection passage 211 from the atmospheric passage 281 and to communicate the canister connection passage 211 with the pressure detection passage 251. In addition, as shown by the arrow R12 in FIG. 3, the actuator 49 of the rotational pump 40 rotates the shaft 45 in the clockwise direction. When the shaft 45 rotates in the clockwise direction, the first rotor member 46, which is accommodated in the first space 410, also rotates in the clockwise direction. Furthermore, the one-way clutch 48 transmits running torque in the clockwise direction to the second rotor member 47. Therefore, the second rotor member 47, which is accommodated in the second space 420, rotates in the clockwise direction. When the second rotor member 47 rotates, as shown by the arrow F15, fluid flows from the first space 410 through the internal communication hole 436 into the second space 420. As shown by the arrow F16, the fluid further flows through the internal communication hole 435 into the first space 410. In this way, air in the first space 410 and the second space 420 flows in the pressure detection passage direction. Therefore, as represented by the arrows F13 and F14 in FIG. 3, air flows from the atmospheric passage 281 toward the pressure detection passage 251 thereby to pressurize the pressure detection passage 251. Pressurization of the pressure detection passage 251 causes air to flow through the switching valve 30 and the canister connection passage 211 into the canister 6. Inside the canister 6, vapor fuel, which is adsorbed in the canister adsorption material 601, is entrained with air, which is drawn with the rotational pump 40, to flow through the second purge passage 131 into the intake pipe 16.

The rotational pump 40 according to the first embodiment has the interior, which is partitioned off into the two spaces including the first space 410 and the second space 420. The first space 410 and the second space 420 accommodate the first rotor member 46 and the second rotor member 47, respectively. Each of the first rotor member 46 and the second rotor member 47 includes the rotor and the multiple vanes. When the shaft 45 rotates in the counterclockwise direction, the first rotor member 46 is selectively rotated in the counterclockwise direction, and the one-way clutch 48 restricts the second rotor member 47 from rotating. In this way, the rotational pump 40 flows vapor in a relatively small quantity from the interior, such as the fuel tank 5 to the atmosphere. To the contrary, when the shaft 45 rotates in the clockwise direction, both the first rotor member 46 and the second rotor member 47 rotate in the clockwise direction. In this way, the rotational pump 40 flows vapor in a relatively large quantity from the atmosphere into the canister 6.

The rotational pump 40 according to the first embodiment changes the volume of vapor movable per unit time, according to the operation of the vapor fuel processing apparatus 1. Specifically, in the fuel vapor leakage detection processing for components, such as the fuel tank 5 and the canister 6, vapor is moved under relatively great differential pressure. Therefore, the first rotor member 46 is selectively (only) rotated to move vapor in a relatively small volume. To the contrary, when vapor fuel, which is absorbed in the canister adsorption material 601, is supplied to the intake pipe 16, vapor is moved under relatively small differential pressure. Therefore, both the first rotor member 46 and the second rotor member 47 are rotated to move vapor in a relatively large volume. The present configuration enables to change the volume of vapor, which moves per unit time, according to the load applied to the rotational pump 40.

Therefore, the present configuration enables to pressurize or depressurize the interior of the fuel tank 5, the canister 6, and/or the like efficiently.

Conventionally, in order to efficiently pressurize or depressurize multiple pipes, which cause different pressure losses respectively, multiple pumps, which are different in performance, may be required according to the pressure losses, respectively. Employment of multiple pumps may cause increase in a manufacturing cost and may complicate the configuration of the device. The rotational pump 40 according to the first embodiment has the two spaces combined to accommodate the two rotor members, respectively. The present configuration enables to supply vapor in a suitable flow quantity to multiple pipes, which cause different pressure losses, respectively. The present configuration enables the singular pump to function as multiple pumps thereby to enable to reduce a manufacturing cost. Furthermore, the present configuration may enable to simplify the device.

Second Embodiment

Subsequently, a rotational pump according to the second embodiment of the present disclosure will be described with reference to FIGS. 4 and 5. In the second embodiment, the shape of a shaft and the shape of a second rotor member are different from those in the first embodiment.

Figure 4:
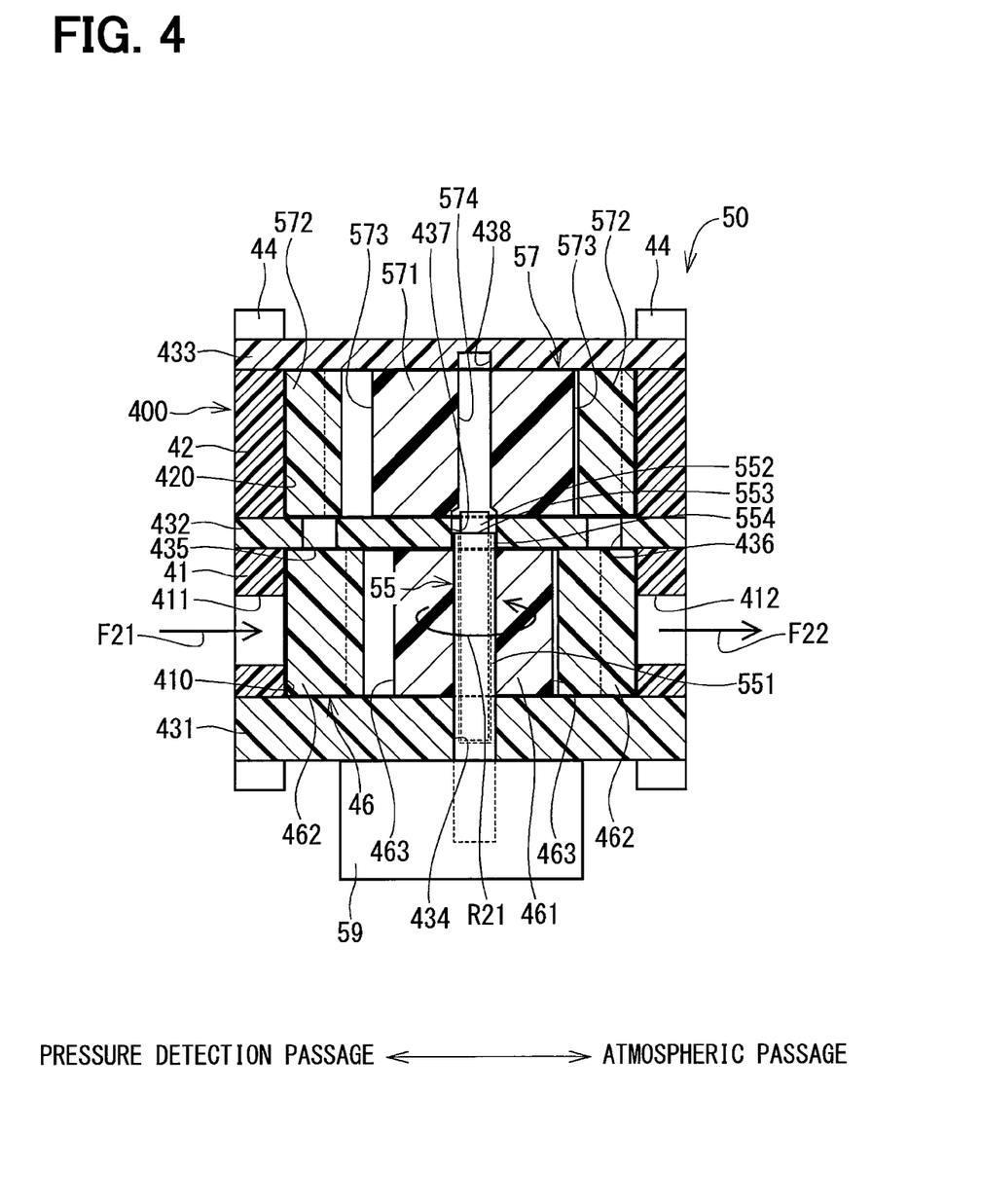
FIG. 4 is a sectional view showing a rotational pump according to a second embodiment of the present disclosure.

As shown in FIG. 4, a rotational pump 50 according to the second embodiment is employed in a vapor fuel processing apparatus. The rotational pump 50 includes the first tubular portion 41, the second tubular portion 42, the first plate member 431, the intermediate member 432, the second plate member 433, a shaft 55, the first rotor member 46, a second rotor member 57, the actuator 59, and/or the like. The vapor fuel processing apparatus employing the rotational pump 50 pressurizes and/or depressurizes the interior of the fuel tank 5, the canister 6, and/or the like, thereby to detect leakage of fuel vapor from a component such as the fuel tank 5. The shaft 55 and the actuator 59 may be equivalent to a torque switching unit.

The shaft 55 includes a first shaft portion 551 and a second shaft portion 552. The shaft 55 is inserted in the insertion hole 434 of the first plate member 431 and the insertion hole 437 of the intermediate member 432.

The first shaft portion 551 is in a bottomed tubular shape. The first shaft portion 551 is connected with an actuator 59 at one end. The actuator 59 is equipped outside the first plate member 431. The first shaft portion 551 has a recessed portion 554 on the opposite side of the one end. The recessed portion 554 has an opening 553. The first shaft portion 551 is fitted to the rotor 461 of the first rotor member 46. When the first shaft portion 551 rotates in a rotational direction, the rotor 461 rotates in the same direction as the rotational direction of the first shaft portion 551.

The second shaft portion 552 is substantially in a column shape. The outer diameter of the second shaft portion 552 is smaller than the outer diameter of the first shaft portion 551. The second shaft portion 552 is accommodated in the first shaft portion 551. The second shaft portion 552 is movable in the axial direction back and forth relative to the first shaft portion 551.

The second rotor member 57 is accommodated in the second space 420. The second rotor member 57 includes a rotor 571, multiple vanes 572, and/or the like.

The rotor 571 has an insertion hole 574 substantially at the center. The insertion hole 574 is configured to receive the second shaft portion 552. When the second shaft portion 552 is inserted into the insertion hole 574, the rotor 571 and the second shaft portion 552 are fitted together. When the rotor 571 and the second shaft portion 552 are fitted together, the rotor 571 rotates in the same direction as the rotational direction of the second shaft portion 552. The vanes 572 are accommodated in multiple grooves 573 of the rotor 571. The vanes 572 are movable in the radial direction. As the rotor 571 rotates, the vanes 572 rotate in the same direction as the rotational direction of the second shaft portion 552, while sliding on the inner wall of the second tubular portion 42 by application of centrifugal force.

The actuator 59 produces a driving force according to an input from the ECU 8. Thus, the actuator 59 rotates the shaft 55 in the clockwise direction and/or in the counterclockwise direction when viewed from the upper side in the drawing. The actuator 59 is configured to change rotation speed of the shaft 55.

The vapor fuel processing apparatus employs the rotational pump 50. The rotational pump 50 depressurizes the interior of the fuel tank 5, the canister 6, and/or the like, thereby to detect leakage of fuel vapor from a component, such as the fuel tank 5. In the configuration, the actuator 59 of the rotational pump 50 rotates the shaft 55 in the direction represented by the arrow R21 in FIG. 4 at a relatively low speed. When the shaft 55 is rotated at a relatively low speed, only the first shaft portion 551 is fitted to a rotor 561 of a first rotor member 56. Therefore, only the first rotor member 56 is rotated. The present configuration enables to supply air from the first space 410 in the atmospheric passage direction. Therefore, as shown by the arrows F21 and F22 in FIG. 4, vapor flows from the pressure detection passage 251 toward the atmospheric passage 281, thereby to depressurize the pressure detection passage 251. Thus, the interior of the fuel tank 5, the canister 6, and/or the like are depressurized to enable detection of leakage of fuel vapor from a component, such as the fuel tank 5, similarly to the first embodiment.

The vapor fuel processing apparatus employs the rotational pump 50. It is conceivable that the rotational pump 50 pressurizes the interior of the fuel tank 5, the canister 6, and/or the like, thereby to detect leakage of fuel vapor from a component, such as the fuel tank 5. In this case, the actuator 59 of the rotational pump 50 rotates the shaft 55 at a relatively low speed in a direction opposite from the direction represented by the arrow R21 in FIG. 4. When the shaft 55 is rotated at a relatively low speed, only the first shaft portion 551 is fitted to the rotor 561 of the first rotor member 56. Therefore, only the first rotor member 56 is rotated. The present configuration enables to supply air from the first space 410 in the fuel passage direction. Therefore, vapor flows from the atmospheric passage 281 toward the pressure detection passage 251, thereby to pressurize the pressure detection passage 251. When the pressure detection passage 251 is pressurized, vapor flows into the atmosphere after passing through the switching valve bypass passage 261, the canister connection passage 211, the switching valve 30, and the atmospheric passage 281. Air flowing into the atmosphere is throttled with the reference orifice 27. Therefore, pressure in the pressure detection passage 251 increases. Pressure in the pressure detection passage 251 increases to a predetermined pressure, which corresponds to the opening area of the reference orifice 27. Subsequently, pressure in the pressure detection passage 251 becomes constant. The pressure in the pressure detection passage 251 as detected is stored as a reference pressure.

Subsequent to the detection of the reference pressure, electricity is supplied to the coil 301 of the switching valve 30. Thus, the fuel tank 5 is communicated with the pressure detection passage 251, thereby to equalize pressure in the pressure detection passage 251 to pressure in the fuel tank 5. In a case where continuation of operation of the rotational pump 50 increases pressure in the fuel tank 5 to be higher than the reference pressure detected previously, it is determined that leakage of vapor, which includes fuel vapor from the fuel tank 5, is below an allowable quantity. That is, it is determined that an airtight property of the fuel tank 5 is sufficiently secured. To the contrary, in a case where continuation of operation of the rotational pump 50 does not increase pressure in the fuel tank 5 to the reference pressure, it is determined that leakage of vapor, which includes fuel vapor from the fuel tank 5, is beyond the allowable quantity. That is, it is determined that the airtight property of the fuel tank 5 is not sufficiently secured.

Figure 5:
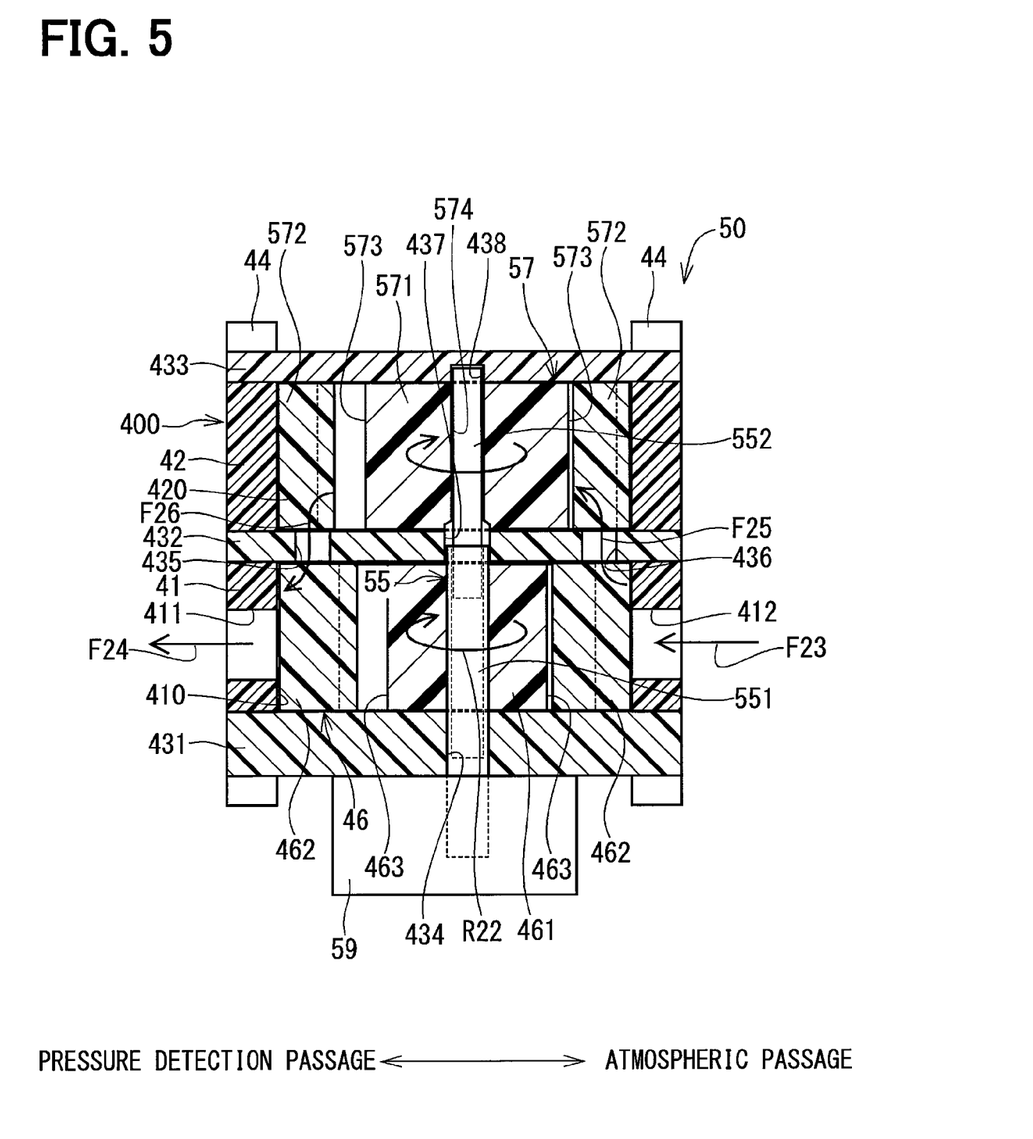
FIG. 5 is a sectional view showing an operation of the rotational pump according to the second embodiment of the present disclosure.

Alternatively, when pressurizing the interior of the canister 6 to supply fuel vapor, which is adsorbed in the canister adsorption material 601, to the intake pipe 16, the actuator 59 of the rotational pump 50 rotates the shaft 55 at a relatively high speed in the direction shown by the arrow R22 in FIG. 5. When the shaft 55 rotates at a relatively high speed, the second shaft portion 552 moves in a direction opposite from the actuator 59. Thus, the second shaft portion 552 is fitted to the rotor 571 of the second rotor member 57. The present configuration enables to rotate both the first rotor member 46 and the second rotor member 57. When the second rotor member 57 rotates, as shown by the arrow F25, fluid in the first space 410 flows through the internal communication hole 436 into the second space 420. As shown by the arrow F26, the fluid further flows through the internal communication hole 435 into the first space 410. In this way, air in the first space 410 and the second space 420 flows in the pressure detection passage direction. Therefore, as shown by the arrows F23 and F24 in FIG. 5, vapor flows from the atmospheric passage 281 toward the pressure detection passage 251, thereby to pressurize the pressure detection passage 251.

The rotational pump 50 according to the second embodiment switches the rotor member, to which the shaft 55 is fitted, according to the rotation speed of the shaft 55 rotated with the actuator 59. The present configuration enables to change the volume of vapor, which moves per unit time, according to the load applied to the rotational pump 50. Therefore, the rotational pump 50 according to the second embodiment produces an effect similarly to the first embodiment.

Other Embodiment (a) In the above embodiments, the rotational pump is employed in the fuel vapor leakage detection device for the vapor fuel processing apparatus. It is noted that, the application of the rotational pump is not limited to that in the above embodiments. The rotational pump may be employed in a device to pressurize and/or depressurize a pipe causing different pressure losses.

(b) In the above embodiments, the rotational pump is employed to move vapor. It is noted that, the rotational pump may be employed to move liquid.

(c) According to the first embodiment, the one-way clutch is equipped as the torque switching unit. According to the second embodiment, the shaft configured to extend and contract according to the rotation speed is equipped as the torque switching unit. It is noted that the torque switching unit is not limited to those in the above embodiments.

The rotational pump according to the present disclosure includes the pump casing, the partition member, the first rotor member, the second rotor member, and the torque switching unit. The partition member partitions the interior of the pump casing into the first space and the second space. The interior of the pump casing has the two external communication holes communicating with the outside. The first space communicates with the two external communication holes. The partition member has the two internal communication holes communicating the first space with the second space. The first rotor member is rotatably accommodated in the first space. The second rotor member is rotatably accommodated in the second space. The torque switching unit is configured to switch between transmission of the running torque selectively (only) to the first rotor member and transmission of the running torque to both the first rotor member and the second rotor member.

The rotational pump according to the present disclosure has the first space and the second space in the pump casing. The first space and the second space communicate with each other through the internal communication holes. The first space and the second space accommodate the first rotor member and the second rotor member, respectively. When the torque switching unit transmits the running torque selectively (only) to the first rotor member, the first rotor member rotates to move fluid in the first space to pass through the two external communication holes. When the torque switching unit transmits the running torque to both the first rotor member and the second rotor member, the first rotor member rotates in the first space, and the second rotor member rotates in the second space. When the first rotor member rotates, fluid in the first space moves to pass through the two external communication holes. When the second rotor member rotates, fluid in the second space moves to flow into the first space and to flow out of the first space while passing through the two internal communication holes. The present configuration enables to cause the torque switching unit to switch transmission of torque thereby to enable the rotational pump as a singular device to select the configuration to supply fluid in a relatively small flow quantity and the configuration to supply fluid in a relatively large flow quantity. Thus, the present configuration may enable to move fluid efficiently with a reasonable power consumption.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:
1. A rotational pump comprising:
a pump casing having two external communication holes communicating with an outside;
a partition member partitioning an interior of the pump casing into a first space and a second space, the first space communicating with the two external communi- cation holes, the partition member having two internal communication holes communicating the first space with the second space;

a first rotor member rotatably accommodated in the first space;

a second rotor member rotatably accommodated in the second space; and a torque switching unit configured to switch between transmission of a running torque selectively to the first rotor member and transmission of the running torque to both the first rotor member and the second rotor member, wherein the torque switching unit includes:

a shaft inserted in the first rotor member and configured to be fitted to the second rotor member; and an actuator configured to rotate the shaft such that the shaft is fitted selectively to the first rotor member or the shaft is fitted to both the first rotor member and the second rotor member, and the shaft includes:

a first shaft portion fitted to the first rotor member; and a second shaft portion slidably accommodated in the first shaft portion and is not fitted to the second rotor member when a rotation speed of the shaft is lower than a predetermined value, wherein the second shaft portion slides relative to the first shaft portion along an axis of the shaft and is projected from the first shaft portion to be fitted to the second rotor member, when a rotation speed of the shaft is higher than the predetermined value.

2. A fuel vapor leakage detection device configured to detect leakage of fuel vapor from at least one of a fuel tank and a canister, the canister configured to adsorb fuel vapor in the fuel tank, the fuel vapor leakage detection device comprising:

a canister passage formation member configured to form a canister connection passage communicating with the canister;

an atmospheric passage formation member forming an atmospheric passage communicating with an atmosphere;

a detection passage formation member forming a pressure detection passage configured to communicate with the canister connection passage;

a switching valve configured to switch selectively between communication of the canister connection passage with the pressure detection passage and communication of the canister connection passage with the atmospheric passage;

the rotational pump according to claim 1, the rotational pump configured to pressurize and depressurize at least one of an interior of the fuel tank and an interior of the canister when the switching valve communicates the canister connection passage with the pressure detection passage and configured to pressurize the interior of the canister when supplying fuel vapor in the canister to the intake passage, which is connected with an internal combustion engine;

a bypass passage formation member forming a switching valve bypass passage, the switching valve bypass passage bypassing the switching valve and communicating the canister connection passage with the pressure detection passage;

a throttle portion equipped to the bypass passage formation member; and a pressure detection unit configured to detect a pressure in the pressure detection passage and configured to send a signal according to the pressure in the pressure detection passage as detected.

* * * * *